Feb. 6, 1968  G. W. SCOTT ET AL  3,368,059
METHOD OF METALLURGICALLY JOINING AN ALUMINUM
CONDUCTOR TO A STRANDED COPPER CONDUCTOR
BY RESISTANCE WELDING

Filed Sept. 18, 1964  2 Sheets-Sheet 1

| STRANDED CONDUCTOR SIZE | A | B | C |
|---|---|---|---|
| 61 — .0294 | 3/16 | 1/4 | 1/4 |
| 49 — .0231 | 1/8 | 3/16 | 3/16 |
| 19 — .0234 259 — .005 | 1/8 | 1/8 | 1/8 |
| 19 — .0185 | 5/64 | 7/64 | 7/64 |
| 19 — .0147 | 3/64 | 1/16 | 1/16 |
| 280 — .002 | 1/32 | 1/32 | 1/32 |

INVENTORS
George W. Scott and
John L. Harper.
BY
ATTORNEY

MAGNIFIED 100X

MAGNIFIED 100X

United States Patent Office 3,368,059
Patented Feb. 6, 1968

3,368,059
METHOD OF METALLURGICALLY JOIN-
ING AN ALUMINUM CONDUCTOR TO
A STRANDED COPPER CONDUCTOR BY
RESISTANCE WELDING
George W. Scott, Sharpsville, and John L. Harper, Lac-
cawona, Pa., assignors to Westinghouse Electric Cor-
poration, Pittsburgh, Pa., a corporation of Pennsylvania
Filed Sept. 18, 1964, Ser. No. 397,513
5 Claims. (Cl. 219—118)

ABSTRACT OF THE DISCLOSURE

A method of welding stranded copper conductor CA (FIG. 1) to aluminum strap S in which the stranded conductor and the strap are engaged between electrodes E1, of lower thermal conductivity (molybdenum), and E2, of higher thermal conductivity (copper), of a resistance welding machine under pressure and current is transmitted between the electrodes to form a eutectic of the copper and aluminum without melting either the conductor CA or the strap S. The eutectic flows into the capillary spaces between the strands of the conductor CA and solidifies to form the joint.

This invention relates to the art of fabricating metallurgical joints between metallic parts and, in its specific but important aspects, has particular relationship to the metallurgical joining of aluminum and copper. In its broader aspects the principles of this invention are applicable to the fabrication of joints between other materials such as aluminum and silver, silver and copper, silver and magnesium, gold and germanium, calcium and copper, and copper and magnesium. To the extent that the principles of this invention are applicable to other materials than aluminum and copper the joining of such different materials are within the scope of this invention.

It has been found desirable to provide certain transformers, particularly those of high-power ratings, with aluminum windings which are in the form of strips, foil or straps or cylindrical wires. It is sometimes necessary to connect these aluminum windings to copper which may be in rope cable or in flat-braided cable form. Bolted joints are not reliable. In producing brazed joints it is necessary that the usual oxide coating on the surface of the aluminum windings be removed from the surface by elaborate cleaning to eliminate corrosion so that an effective connection may be established. Brazed joints are then costly because of the demand for cleaning and they are unreliable because of the probability of improper cleaning in some cases and resulting corrosion.

In the welding of the copper to the aluminum windings by ordinary welding procedures the difficulty is presented that aluminum and copper form a copper-aluminum eutectic which is highly brittle. Provisions must be made for preventing the brittle eutectic from cracking after the welding operation. In attempts to overcome the above-described difficulty, welded joints of the aluminum windings and the copper braid have been produced by flash-welding and by percussion-welding techniques. These techniques require large and complex apparatus which is not readily portable. The lack of portability constitutes a serious deficiency in the joining apparatus because in the production of transformers it is essential that the connections be made as the parts are assembled and it is necessary to move the joining equipment to the assembly points.

It is an object of this invention to overcome the above-described difficulties and to provide a method for reliably joining aluminum windings to stranded copper conductors with apparatus which shall be readily portable to any desired point in a manufacturing plant.

It is another object of this invention to provide a method of reliably joining aluminum windings of a transformer, or the like, to stranded copper conductors the practice of which shall be feasible with readily portable apparatus. More generally, it is an object of this invention to provide such a method for joining a stranded conductor of one material to a solid conductor of another material.

This invention in its specific aspects as applied to copper and aluminum arises from the realization that the difficulties encountered are principally caused by the retention of the copper-aluminum eutectic produced during the welding as part of the material which holds the copper and aluminum parts together. In flash and percussion welding attempts are made to squeeze out or extrude this eutectic. In accordance with this invention the eutectic is dispersed by capillary action. Under pressure between the strands and the joint is essentially a solid phase joint.

In the practice of this invention in its specific aspects, reliance is placed on the difference between the respective melting points or liquidus temperatures of the aluminum and the copper to produce the solid phase joint. Aluminum has a melting point of 1200° F. copper has a substantially higher melting point, 1981.4° F. The eutectic of copper and aluminum melts at about 1018° F.

In the practice of this invention a metallurgical joint between the copper and aluminum is formed by resistance spot welding the aluminum and copper under such conditions that only liquid aluminum-copper eutectic exists in higher localized regions. The spot welds are produced with resistance welding apparatus which may be portable and which has timing and heat-control facilitates, for setting the welding current density, and also facilities for selectively setting the pressure which is applied by the welding electrodes to the work. Typical apparatus for the practice of this invention includes a timer which causes a predetermined number of successive half cycles of single-phase alternating current of commercial frequency to flow through the joint. The heat, or average current density, supplied for welding is determined by initiating the flow of the welding current approximately at predetermined instants or angles in the half cycles in which the welding current flows. By proper setting of the duration of the welding current and/or the heat supplied for welding and/or the pressure applied by the electrodes in the welding of stranded cable and aluminum windings, the aluminum-copper eutectic in the region of contact of the cable and the winding is melted and dispersed by pressure and capillary action between the strands. A metallurgical solid-phase electrically conducting bond, which does not depend solely on the strength of the brittle eutectic for integrity, is thus produced.

In the practice of this invention the welding electrode in contact with the aluminum winding is of highly conductive material, such as copper and has a flat face; the electrode in engagement with the copper is composed of a material of lower electrical conductivity such as molybdenum and is formed at its tip so as to conform to the shape of the copper. For copper rope the electrode in engagement with the copper has a curved tip to conform to the cylindrical surface of the rope. Where the copper is flat braid the electrode in engagement with the copper has a flat wedge-shaped tip. In each case the electrode in engagement with the copper should be radiused to avoid any sharp lines at the junction between the copper and the electrode. Because of the difference in conductivity of the electrodes the aluminum is maintained substantially cooler than the copper and the copper is heated to a higher temperature than the aluminum. But the temperature of the copper is not so high as to liquify the copper and temperature of the aluminum is not so high as to liquify the aluminum. To minimize the effect of the copper-aluminum eutectic the copper may in accordance with the specific aspects of this invention be tinned; that is, be dipped or have deposited thereon electrolytically a coating of a lead-tin alloy.

Certain features considered characteristic of this invention are disclosed generally above. For a better understanding of this invention both as to its organization and as to its method of operation, together with additional objects and advantages thereof, reference is made to the following description of this invention taken in connection with the accompanying drawings, in which:

FIGS. 6 and 7 are presented for the purpose of aiding those skilled in the art in practicing this invention and not with any intention of in any way restricting this invention.

Figure 1:
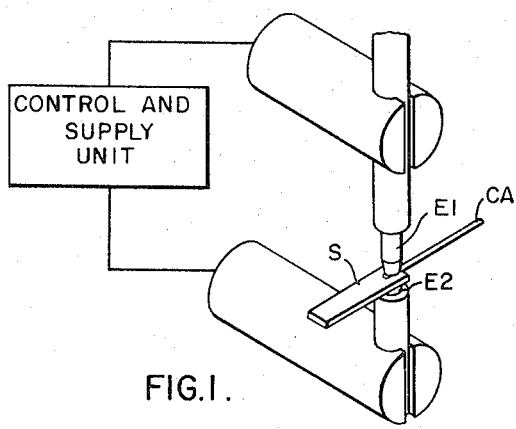
FIGURE 1 is a diagrammatic view showing apparatus for carrying out this invention.
Figure 2:
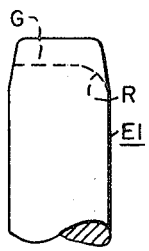
FIG. 2 is a fragmentary view in side elevation of the welding electrode which engages the cable in the practice of this invention where the joint is between copper rope and a winding.
Figure 3:
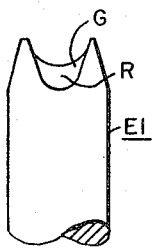
FIG. 3 is a fragmentary view in side elevation of the same electrode from a different aspect than for FIG. 2.
Figure 4:
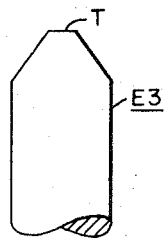
FIG. 4 is a view in side elevation of the electrode which engages the cable in the practice of this invention where the cable is flat or ribbon shaped.
Figure 5:
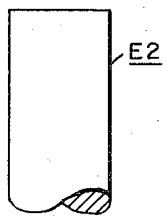
FIG. 5 is a fragmentary view in side elevation of the electrode which engages the winding in the practice of this invention.
Figure 7:
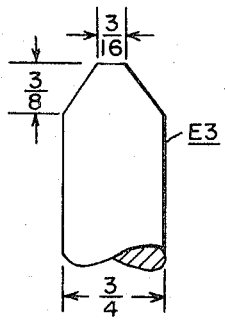
FIG. 7 is a view similar to FIG. 4 but showing the dimensions of the welding wedge shaped electrode for welding braid consisting of 912 strands of .005 inch diameter wire.
Figure 6:
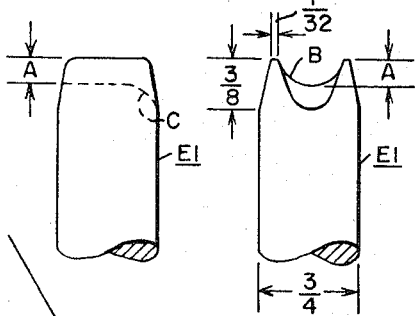
FIG. 6 is a view showing the dimensions of the electrodes shown in FIGS. 2 and 3.

The apparatus shown in FIGS. 1 through 7 is a relatively portable welding machine including electrodes E1 and E2 and a Control And Supply Unit. In practicing this invention the stranded conductor CA and aluminum strap or winding S are interposed between the electrodes E1 and E2, with the stranded conductor overlapping the aluminum, and pressure is supplied between the electrode and welding current transmitted therethrough for a predetermined discrete time interval to produce the joint. The electrode E1 is in engagement with the stranded conductor CA and the electrode E2 is in engagement with the strap S.

The electrode E1 has the form conforming with the conductor CA. Where the conductor is of generally cylindrical or rope form the tip of the electrode E1 has a generally cylindrical groove G (FIGS. 2 and 3) which is dimensioned to conform with the conductor. The tip is radiused at R to eliminate any sharp lines at the junction between the electrode and the conductor. For braided cable an electrode E3 is used, this electrode has a tapered tip T the end of which engages the cable throughout its width.

The Control And Supply Unit is shown as a single block but may consist of a number of parts in one locality or a number of parts adjacent the electrodes and remote parts. This apparatus supplies current for producing the welded joint and also includes facilities for controlling the current. Typically the welding current is supplied through a high-ratio step-down transformer the primary being connected to the 60 cycle commercial supply through the usual control components such as ignitrons or silicon-controlled rectifiers and the secondary being connected directly between the electrodes E1 and E2. Very high current then flows through the electrodes E1 and E2 and the work which includes the conductor C and strap S.

The control portion of the equipment may set so that the current is supplied during a predetermined number of successive half periods of the supply. The duration of the current is thus determined. The magnitude of the current may be set by setting approximately the instants in the half periods, during which current flows, at which the flow of current in initiated. Where the instants are early in each half period the current is of high magnitude and where the instants are late in each half period the current is of low magnitude.

In the practice of this invention the control and the supply unit are preset. Where necessary the tap transformer through which the welding current is supplied may be set to the proper tap. The heat control setting on the Control And Supply Unit is then set to the proper heat. The pressure mechanism on the welding apparatus and the Control And Supply Unit is set to the required pressure and the timer is set so that the welding current flows during a predetermined number of half periods of the supply. The strap S is then disposed on the copper welding electrode E2 and the braided conductor CA is brought into contact with the strap. The operator then brings the molybdenum welding electrode E1 into engagement with the conductor CA with the grooved portion G on the electrode encircling the conductor. The switch mechanism on the Control And Supply Unit is then closed, pressure is applied and the welding current flows during the prescribed interval. The settings should be such that the aluminum-copper eutectic is liquified and flows by capillarity between the strands of the copper conductor.

Satisfactory welds have been made in the practice of this invention with a number of different conductors and straps of different dimensions. The following Table I presents the information on the settings used in the making of a number of different welds. In the first column on the left the copper conductor CA is identified by the number of strands and the diameter of each strand. For example, the copper conductor CA in the first row consisted of 61 strands of .0297 inch diameter wire. The second column gives the dimensions of the strap S to which the conductor was welded. The conductor CA in the first row was welded to an aluminum strap S of ⅛ inch by 1 inch by 3 inches. The third column gives the heat setting on the Control and Supply Unit in percent. In the welding of the conductor in the first row the heat setting was at 100%. In this setting the welding current was initiated as early as practicable in the half periods of the supply during which the welding current flowed. The next column gives the number of periods during which the current flowed. In the case of the first weld the current flowed for 80 full periods of a 60 cycle supply. The duration of this current would be about 1⅓ seconds. The force applied is given in the next column and was 460 pounds for the first weld. The welding current in amperes RMS is given in the next column and was 25,100 amperes. The welds corresponding to Table I proved entirely satisfactory.

Figure 8:
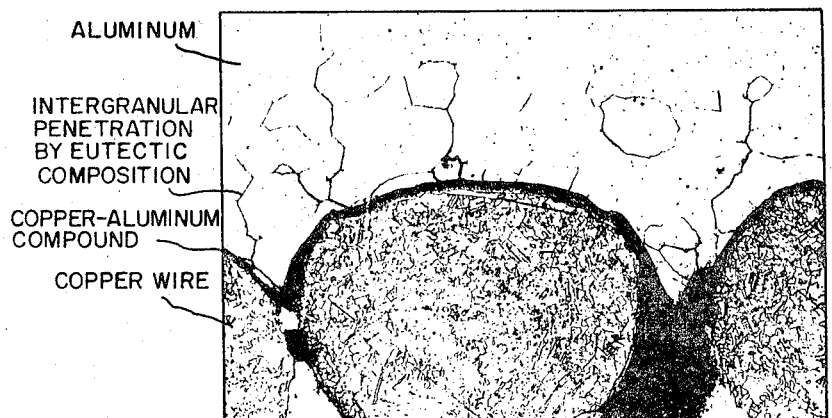
FIG. 8 is a copy of a photomicrograph of a weld produced in the practice of this invention.
Figure 9:
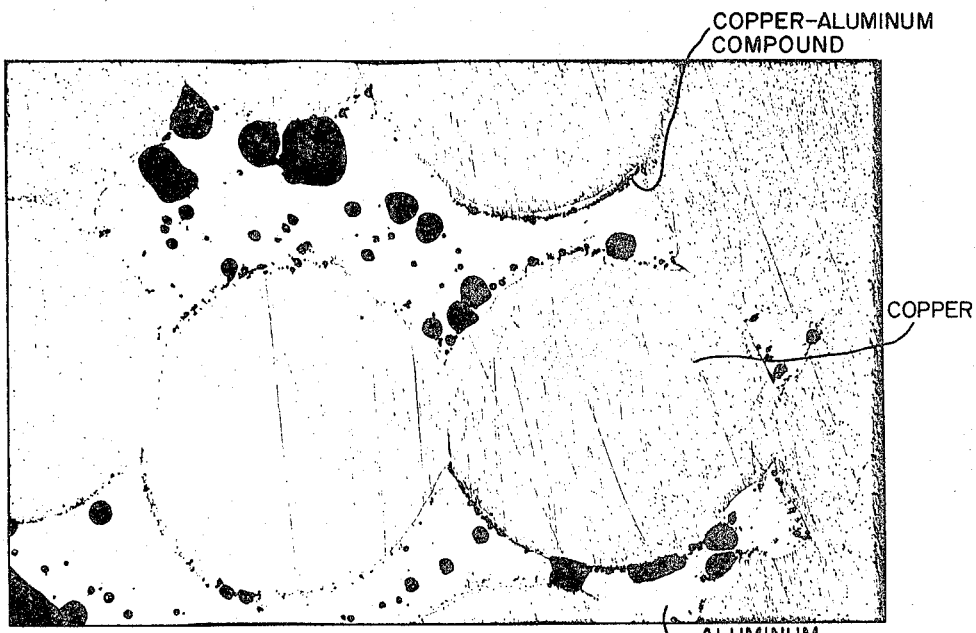
FIG. 9 is a copy of a photomicrograph of another weld produced in the practice of this invention.

FIGS. 8 and 9 show photomicrographs of a section of a joint between the stranded copper and aluminum strap. The parts of the photomicrograph corresponding to the various components of the weld are labeled.

TABLE I

| Copper Conductor Size | Aluminum Strap Size | Heat Setting in Percent | Heat Time Full Periods of 60 cycle Supply | Electrode Force in Pounds | Current amperes RMS |
|---|---|---|---|---|---|
| 61 strands of .0297″ | ⅛″ x 1″ x 3″ | 100 | 80 | 460 | 25,100 |
| 19 strands of .0234″ | ⅛″ x 1″ x 3″ | 95 | 35 | 280 | 16,000 |
| 259 strands of .005″ | ⅛″ x 1″ x 3″ | 84 | 32 | 280 | 15,000 |
| 19 strands of .0185″ | ⅛″ x 1″ x 3″ | 90 | 30 | 280 | 15,500 |
| 19 strands of .0147″ | .032 Strip | 70 | 30 | 230 | 12,000 |
| 280 strands of .002″ | .032 Strip | 80 | 10 | 180 | 14,500 |
| 49 strands of .0234″ | ⅛″ x 1″ x 3″ | 100 | 18 | 300 | 26,000 |

Joints in accordance with this invention were compared to copper-to-copper brazed joints with respect to resistance to vibration, shear and tear. The copper-to-copper joints were made by resistance brazing ¼″ diameter stranded conductor to a 0.1″ x 1.0″ strap with brazing alloy including 80% copper-15% silver-5% phosphorus. The copper-to-aluminum joints were resistance spot welded in accordance with this invention. In both joints the copper conductor overlapped the copper or aluminum straps by 0.5″.

The vibration tests were conducted at 23° C. The strap was fastened in vise jaws and the conductor was fastened to an eccentric cam 1¼″ from the joint. Vibration was in vertical direction and specimens were tested at three different total deflections in the as-received condition. Other specimens were tested at 0.2″ deflections after exposure to 95% relative humidity for two weeks. Condensation was allowed to occur on some of the specimens. All results are listed in Table II.

TABLE II

| Type Joint | Test Conditions | Total Deflection, inch | Cycles to Failure |
|---|---|---|---|
| Copper to copper | Specimen as received | 0.368 | 4,000 |
|  |  | 0.372 | 2,000 |
| Do | do | 0.202 | 14,000 |
|  |  | 0.202 | 15,000 |
| Do | do | 0.10 | 125,000 |
|  |  |  | [1] 62,000 |
| Copper to aluminum | do | 0.372 | 6,000 |
|  |  | 0.372 | 6,000 |
| Do | do | 0.202 | 40,000 |
|  |  | 0.202 | 45,000 |
|  |  | 0.10 | 658,000 |
| Do | do | 0.10 | 130,000 |
| Do | do | 0.10 | 300,000 |
| Copper to copper | After two weeks exposure to 95% R.H. no condensation. | 0.2 | 12,000 |
|  |  | 0.2 | 14,000 |
|  |  | 0.2 | 16,300 |
| Copper to aluminum | do | 0.2 | 28,600 |
|  |  | 0.2 | 43,400 |
|  |  | 0.2 | 24,000 |
| Copper to copper | do | 0.2 | 26,000 |
|  |  | 0.2 | 22,000 |
|  |  | 0.2 | 11,000 |
| Copper to aluminum | do | 0.2 | 32,000 |
|  |  | 0.2 | 24,000 |
|  |  | 0.2 | 20,000 |

[1] Defective joint.

Shear tests were conducted on "as-received" joints at 23° C. Because the specimens were single lap joints, the loads reported are not true shear. Results are listed in Table III.

TABLE III

| Type Joint | Shear Strength and Ultimate Shear, Load-Pounds | Remarks |
|---|---|---|
| ¼″ stranded copper cable to copper strap (1/16″ x 1″ x 2″). | 636<br>648 | Fracture occurred in copper cable at the end of the heat-affected zone. |
| Copper cable to aluminum strap ⅛″ x 1″ x 2″. | 450<br>535 | Copper cable tore out of the aluminum; some aluminum adhered to the copper strands adhered to the aluminum strap. |

Tear tests were also conducted at 23° C. The strap portion of the joints was held in the tensile machine in a horizontal position and the cable torn off in a vertical direction. Loads required to tear the cables from the straps are listed in Table IV.

TABLE IV

| Type Joint | Tear Strength and Ultimate Tear, Load-Pounds | Remarks |
|---|---|---|
| Copper cable to copper strap 1/16″ x 1″ x 2″. | 333 | Fracture occurred in copper wire. |
| Copper strap 1/16″ x 1″ x 2″ | 233 | Fracture occurred partially in cable and partially in brazed joint. |
| Do | 472 | Fracture occurred in cable and partially in plate. |
| Copper cable to aluminum strap ⅛″ x 1″ x 2″. | 96<br>115 | Copper tore out of aluminum. Copper tore out of aluminum; some flaking of the aluminum-copper compound occurred. |
| Do | 106 | Copper cable tore out of the aluminum strap and the copper-aluminum compound flaked off. |

These tests indicate that the methods in accordance with this invention is capable of producing usable joints which are satisfactory for transformers having aluminum windings.

The following is a summary briefly describing the important features of the invention.

When aluminum is used for windings in making transformers, it has been found to be necessary to make connections to copper. This has presented a number of problems; since the oxide of aluminum is a non-conductor, it must be removed so that a good electrical connection can be made. Bolted connections are not desirable since they are not reliable.

There are only several methods by which the welding of aluminum to copper has been carried out. A brittle copper-aluminum eutectic is formed in such welding and measures must be taken to prevent the eutectic from cracking after welding. Special techniques have been developed for flash welding and percussion welding copper-aluminum joints, but these methods require elaborate equipment which is not portable. Portable equipment is highly desirable for production processing to make connections as parts are assembled.

This invention is a method of spot welding for joining metallurgically stranded copper conductors to aluminum strap to make a good electrical connection, and the process can be applied either as a station operation or with portable equipment. The invention consists of the development of the balance between time, current density and pressure to bring the copper conductor into intimate contact with aluminum strap so that liquid aluminum-copper eutectic in the area at the point of contact is brought up through the strands of copper by capillary action and the whole compacted and cooled.

A conventional copper electrode E2 is used on the bottom with a flat contact surface. This is adjacent to the aluminum; the top electrode E1 (or E3) comprises a shaped molybdenum electrode to fit the conductor; the electrode E1 (or E3) is radiused to avoid a sharp line between the conductor and the solidified end. For flat braided conductor, a flat wedged shaped molybdenum electrode E3 is used to concentrate the heat.

It must be recognized that the brittle copper-aluminum eutectic is formed, but because there is a solid phase reaction at the point the dispersion minimizes the effect and a satisfactory joint is produced.

To minimize the effect of the copper-aluminum eutectic tinned copper cable can be used. In most applications, it is possible to fasten the connection securely so that the effect of the eutectic is not a hazard. As used in this application the word "eutectic" means the copper-aluminum composition at the lowest liquidus temperature but includes within its scope a reasonable range of aluminum-copper composition on both sides of the composition at the lowest liquidus point.

The method according to the invention is so rapid that no heat affected zone is visible and undue cleaning is not required. The cost of making the joints is low.

While preferred methods according to this invention are disclosed herein many modifications are all feasible. This invention then is not to be restricted except insofar as is necessitated by this spirit of the prior art.

We claim as our invention:

1. The method of metallurgically joining an aluminum conductor to a stranded copper conductor by resistance welding with resistance welding electrodes, the said method comprising, bringing said aluminum and copper conductors into engagement to form a joint between said conductors, causing said electrodes to engage said conductors in resistance welding relationship under pressure with the electrodes engaging and applying said pressure to said conductors so that said pressure is exerted between said conductors at said joint, transmitting resistance welding current through said electrodes and said conductors while said electrodes so engage said conductors, for a predetermined time interval to produce a joint, at least one of said time interval, the current density of the said welding current and said pressure being set so that the aluminum-copper eutectic of said aluminum and copper conductors at the region of contact between said aluminum and copper conductors melts and is dispersed by capillarity and pressure between the strands of said copper conductor.

2. The method of metallurgically joining an aluminum conductor to a stranded copper conductor by resistance welding with resistance welding electrodes, one of said electrodes having substantially higher electrical resistance than the other, the said method comprising, bringing said aluminum and copper conductors into engagement to form a joint between said conductors, causing said electrodes to engage said conductors in resistance welding relationship under pressure with the electrodes engaging and applying said pressure to said conductors so that said pressure is exerted between said conductors at said joint, said higher resistance electrode engaging said copper conductor and said lower resistance electrode engaging said aluminum conductor, transmitting resistance welding current through said electrodes and said conductors while said electrodes so engage said conductors, for a predetermined time interval to produce a joint, at least one of said time interval, the current density of the said welding current and said pressure being set so that the aluminum-copper eutectic of said aluminum and copper conductors at the region of contact between said aluminum and copper conductors melts and is dispersed by capillarity and pressure between the strands of said copper conductor.

3. The method of metallurgical joining an aluminum conductor to a stranded copper conductor, the said method comprising bringing said conductors into contact under pressure to form a region of contact of said conductors, in which region the strands of said copper conductor engage the aluminum conductor and provide capillary spaces between said strands immediately adjacent said aluminum conductor, transmitting current through said conductors to form a liquid aluminum-copper eutectic of the material of said conductors in said region of contact of said conductors, said aluminum-copper eutectic being dispersed by capillarity in and said pressure in said capillary spaces between the strands of said copper conductor, and permitting said eutectic to solidify.

4. The method of metallurgical joining an aluminum conductor to a stranded copper conductor, the said method comprising bringing said conductors into contact under pressure to form a region of contact of said conductors, in which region the strands of said copper conductor engage the aluminum conductor and provide capillary spaces between said strands immediately adjacent said aluminum conductor, transmitting current through said conductors, while said current is being transmitted cooling said aluminum conductor at a substantially higher rate than said copper conductor so that said copper conductor is maintained at a substantially higher temperature than said aluminum conductor by said current, transmission of said current forming an aluminum-copper eutectic of said material of said conductors in the region of contact of said conductors, said aluminum-copper eutectic being dispersed by capillarity and pressure in said capillary spaces between the strands of said copper conductor, and after said eutectic is dispersed permitting said eutectic to solidify.

5. The method of metallurgical joining a conductor of a first material to a stranded conductor of a second material; said first and second materials forming a eutectic having a lower melting point than either of said materials, the said method comprising bringing said conductors into contact under pressure to form a region of contact of said conductors, in which region the strands of said copper conductor engage the aluminum conductor and provide capillary spaces between said strands immediately adjacent said aluminum conductor, transmitting current through said conductors to form a liquid of said eutectic in said region of contact of said conductors, dispersing said eutectic by capillarity and said pressure in said capillary spaces between the strands of said second conductor, and permitting said liquid eutectic to solidify.

References Cited

UNITED STATES PATENTS

| | | | |
|---|---|---|---|
| 2,114,837 | 4/1938 | Gillette | 219—118 |
| 2,253,375 | 8/1941 | Henninger | 219—91 |
| 2,276,010 | 3/1942 | Bernard | 219—118 |
| 2,790,656 | 4/1957 | Cook | 219—118 |
| 2,883,518 | 5/1959 | Zabka et al. | 219—118 |
| 3,121,785 | 2/1964 | Terrill | 219—118 |

RICHARD M. WOOD, *Primary Examiner.*

W. D. BROOKS, *Assistant Examiner.*